(12) United States Patent
Seaman et al.

(10) Patent No.: US 7,047,215 B2
(45) Date of Patent: May 16, 2006

(54) PARTS REQUIREMENT PLANNING SYSTEM AND METHOD ACROSS AN EXTENDED SUPPLY CHAIN

(75) Inventors: E. Weston Seaman, Poughkeepsie, NY (US); Kamkeung Ho, New Milford, CT (US); John C. Barnes, Stormville, NY (US); Lewis J. Hakim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 09/730,683

(22) Filed: Dec. 6, 2000

(65) Prior Publication Data

US 2002/0099612 A1 Jul. 25, 2002

(51) Int. Cl.
*G06Q 30/00* (2006.01)
*G06F 17/50* (2006.01)

(52) U.S. Cl. .............................. 705/28; 705/26; 705/29

(58) Field of Classification Search .................. 705/26, 705/28, 29, 10
See application file for complete search history.

(56) References Cited

U.S. PATENT DOCUMENTS

| | | | | |
|---|---|---|---|---|
| 5,117,354 A | * | 5/1992 | Long et al. .................. | 705/27 |
| 5,319,542 A | | 6/1994 | King, Jr. et al. | |
| 5,446,890 A | | 8/1995 | Renslo et al. | |
| 5,570,291 A | * | 10/1996 | Dudle et al. ................. | 700/95 |
| 5,710,887 A | | 1/1998 | Chelliah et al. | |
| 5,712,985 A | | 1/1998 | Lee et al. | |
| 5,712,989 A | * | 1/1998 | Johnson et al. .............. | 705/28 |
| 5,758,327 A | | 5/1998 | Gardner et al. | |
| 5,842,178 A | | 11/1998 | Giovannoli | |
| 5,923,552 A | | 7/1999 | Brown et al. | |
| 5,974,395 A | * | 10/1999 | Bellini et al. ................ | 705/9 |
| 5,978,811 A | | 11/1999 | Smiley | |
| 6,035,289 A | | 3/2000 | Chou et al. | |
| 6,055,519 A | | 4/2000 | Kennedy et al. | |
| 6,115,690 A | * | 9/2000 | Wong ........................... | 705/7 |
| 6,167,378 A | * | 12/2000 | Webber, Jr. ................. | 705/8 |
| 6,199,050 B1 | * | 3/2001 | Alaia et al. .................. | 705/37 |
| 6,230,146 B1 | * | 5/2001 | Alaia et al. .................. | 705/37 |

(Continued)

FOREIGN PATENT DOCUMENTS

JP 04247567 9/1992

(Continued)

OTHER PUBLICATIONS

Brunelli" Online auctions save millions for Quaker Oats and SmithKline", Mar. 23, 2000, Peuchasing Magazine Online, downloaded from www.manufacturing.net/pur/index. asp?layout=articlePrint&articleID=CA147070 on Aug. 22, 2003, 2 pages.*

(Continued)

*Primary Examiner*—Katherine Mitchell
(74) *Attorney, Agent, or Firm*—Jay H. Anderson; Cantor Colburn LLP

(57) ABSTRACT

An exemplary embodiment of the invention relates to a method and system for performing parts requirement planning activities across an extended supply chain. The method comprises loading a bill of material file into a computer network, processing the bill of material file, generating a bid request from the bill of material file, and transmitting the bid request to a web site. The method further includes receiving at least one bid response from a supplier, analyzing the bid response, generating an award notice, and transmitting the award notice to the supplier. The method also includes tracking selected activities in a log. Processing the bill of material file includes incorporating marketing cost analysis data into the computer network.

44 Claims, 16 Drawing Sheets

U.S. PATENT DOCUMENTS

| | | | |
|---|---|---|---|
| 6,249,772 B1* | 6/2001 | Walker et al. | 705/26 |
| 6,260,024 B1* | 7/2001 | Shkedy | 705/37 |
| 6,343,275 B1* | 1/2002 | Wong | 705/26 |
| 6,594,799 B1* | 7/2003 | Robertson et al. | 716/1 |
| 6,606,744 B1* | 8/2003 | Mikurak | 717/174 |
| 2002/0007324 A1* | 1/2002 | Centner et al. | 705/26 |
| 2002/0143692 A1* | 10/2002 | Heimermann et al. | 705/37 |

FOREIGN PATENT DOCUMENTS

| | | |
|---|---|---|
| JP | 06096089 | 4/1994 |
| JP | 06119309 | 4/1994 |
| JP | 11110451 | 10/1997 |
| JP | 2002074045 A * | 3/2002 |
| WO | WO 97/28506 * | 8/1995 |
| WO | WO/00/23929 | 4/2000 |
| WO | WO00/58898 A2 * | 10/2000 |

OTHER PUBLICATIONS

Carbone" E-Procurement at IBM: POs are just the beginning", Purchasing Magazine Online, Mar. 23, 2000, downloaded from www.manufacturing.net/pur/index.asp?layout=articlePrint&articleID=CA147086 on Aug. 22, 2003, 4 pages.*

Harbert "Searching for .COM-ponents" Electronic Business, downloaded from www.reed-electronics.com/eb-mag/index.asp?layout=articlePrint&articleID=CA65528 on Aug. 22, 2003, 7 pages.*

Carbone"What Buyers look for in contract manufacturers", Purchasing Magazine Online, Mar. 23, 2000, downloaded from www.manufacturing.net/pur/index.asp?layout=articlePrint&articleID=CA146851 on Aug. 22, 2003, 4 pages.*

Dialog file 07601750, Gale Group PROMT, Purchasing plans e-biz online supply registry, Purchasing, v129, nl, p261, Jul. 13, 2000, 27 pages.*

Stephens et al., "Cross functional Interface of marketing and Accounting", Mid-American Journal of Business, vol. 13, No. 1, Spring 1998, pp. 31-40 plus cover.*

Srinivasan et al., "E-Business in th Supply Chain", from www.ssgrr.it/en/ssgrr2000/papers/217.pdf, 10 pages, date unknown.*

Aberdeen Group "Profile Supply Works, Inc"Jun. 2000, from www.supplyworks.com/press/06001731.pdf, 10 pages.*

Staff "A sampling of web sitesw that feature auctions or reverse auctions" Purchasing Magazine Online, Mar. 23, 2000, downloaded from www.manufacturing.net/pur/index.asp?layout=articlePrint&articleID=CA147092 on Aug. 22, 2003, 2 pages.*

Press Release "DesignWin Upgrade Tackles Key OEM Supply Chain Management Issues" Jun. 27, 2000, downloaded from www.polydyne.com/pr_jun27.jtm on Aug. 22, 2003, 2 pages.*

Alaniz et al. "E-Procurement A Guide to Buy-Side Applications", Stephens, Inc Industry Report, Dec. 27, 1999, 55 pages.*

Staff "Purchasing Plans e-biz online supply registry" Purchasing Magazine Online, Mar. 23, 2000, downloaded from www.manufacturing.net/pur/index.asp?layout=articlePrint&articleID=CA139096 on Aug. 22, 2003, pp. 1-5 and 14-16 only.*

Spera "Managing Front End Data More Efficiently", EP&P, Aegis Industry Publicaiton Series, 4 pages including cover, Feb. 2000.*

FreeMarkets "United Technologies Corporation Case Study", and brochures from www.freemarkets.com, undated, 12 pages.*

PolyDyne Development Corp "Software for Effective Supply Chain Management DESIGN WIN", available at least as early as Apr. 1999 when first sold; 4 pages.*

PolyDyne Development Corp "SupplyWin Software The Premier EDI Quoting Solution", available at least as early as May 1996 when first sold, 4 pages.*

PolyDyne Development Corp QuoteWin Software for the Material Quote Process, available at least as early as 1997 when first sold, 8 pages.*

* cited by examiner

PARTS REQUIREMENT PLANNING SYSTEM AND METHOD ACROSS AN EXTENDED SUPPLY CHAIN

BACKGROUND OF THE INVENTION

The present invention relates generally to supply chain management of outsourced goods. More particularly, the present invention relates to an enhanced method and system for parts procurement and production planning among supply chain partners in a multi-enterprise environment.

Conventional planning systems such as Enterprise Resource Planning (ERP), Material Requirements Planning (MRP) and Advanced Planning and Scheduling (APS) are well known in many industries today as useful methods for planning enterprise operations. ERP systems provide a framework that integrates all facets of a business, including planning, manufacturing, supply chain management, sales and marketing. Common ERP software vendors such as SAP(™), Oracle(™), Baan(™), and Peoplesoft(™) are enabling businesses to implement these systems using computers. Traditional Material Requirements Planning (MRP) and Manufacturing Resource Planning systems generate requirements for materials, parts, and subassemblies that are established on an organization's Bills of Material (BOMs) for the manufacture of existing products.

With the advent of the Internet and related technology, more complex planning systems have evolved that allow two or more disparate and/or geographically independent businesses to interact with one another via a combination of network-based hardware and software solutions. Based on common communication protocols and common standards for system interoperability, the Internet provides a ubiquitous message routing architecture that supports reliable inter-business connectivity around the world. Further, the Internet and related intranet and extranet technologies offer a relatively low cost of entry, making them practical for use by the largest PC manufacturer as well as the smallest custom-integrated circuit supplier. To alleviate related web-based security issues, companies have created two separate networks: an intranet that connects the internal processes to the applications and data they need and an extranet that connects external processes to the applications and data they need. These companies then add firewalls or security devices to protect against unauthorized access to the internal network and to isolate unauthorized Internet access from the extranet.

Despite these advances in planning systems and Internet technology, Supply Chain Management (SCM) has been for some time, the weak or missing link. SCM involves the administration of an organization's supply channels, distribution, and transportation resources, including product ordering, fulfillment and replenishment. Many software vendors are scrambling to fill the void so that existing barriers between trading partners can be removed and a more synchronized flow of information can be facilitated.

Effective supply chain management is particularly important to the electronics industry. In today's global economy, particularly with respect to computer technology, life cycles and prices related to electronics such as personal computers, PDAs, cellular telephones, etc., have dramatically declined over the last ten years. Further, the growth of e-commerce on the Internet creates additional pressures on this industry as traditional geographic barriers are broken down and new businesses/competitors are entering the market. In order to stay competitive, these market dynamics require electronics businesses to develop and introduce new products faster and cheaper than the competition. To meet this demand, new and enhanced business solutions are critical.

A recent trend in electronics manufacturing involves contracting out some or all of the manufacturing of a manufacturer's computer products to third party manufacturers which then build these products according to specification. This arrangement, known as outsourcing, results where the original manufacturer (called an Original Equipment Manufacturer, or OEM) buys computers in bulk from third-party contract manufacturers and then customizes them for a particular application. It then markets and sells the customized computers under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

In an effort to facilitate the outsourcing processes, OEMs and their manufacturers and suppliers are forming what are known as virtual corporations (or extended enterprises) whereby each entity within the network, or supply chain, specializes in a particular area and, together, operate as one organization or business with respect to the products being produced. In order for these separate entities to effectively operate as one, they must be able to synchronize and share information and fully integrate their existing business processes. Information shared, such as product descriptions, bills of materials (BOMs), approved manufacturers/suppliers lists, etc., must be complete, accurate and up-to-date. Additionally, architectures and applications based on open standards are required in order for complete collaboration in real time within and among the supply chain entities to occur. Few existing applications provide integrated supply chain management solutions and none of these provide complete, synchronized collaboration abilities.

For example, the bidding process between an OEM and its contract manufacturers and suppliers is riddled with inefficiencies. Oftentimes an OEM is able to procure parts components for its 'in-house' assemblies at a much cheaper price than its contract manufacturers are able to due to the large volumes of purchasing it engages in. A contract manufacturer who pays more than the OEM for the same component necessarily passes on this extra cost to the OEM once the assembly is completed. The OEM, in turn, must sell the finished product to its customers at a higher cost. A process is therefore desirable which can improve the existing parts requirement planning system across an extended supply chain.

BRIEF SUMMARY OF THE INVENTION

An exemplary embodiment of the invention relates to a computer-based system and method for automating supply chain functions in a network environment, and more particularly, for identifying and implementing cost-savings techniques within the parts planning and procurement system of an extended enterprise. The system includes a manufacturing enterprise system comprising a host system operating a web server, an applications server, and a database manager; a data storage device in communication with the host system, and at least one terminal for accessing the host system. The manufacturing enterprise system runs on a network that is coupled to the Internet and is accessible to a supplier enterprise system identified with proper permissions. The applications server executes a set of programs for managing the manufacturing enterprise system, including the A-source application and parts requirement planning tool of the present invention. Bills of material, requests for quotes (RFQs), requests for price updates, and the physical and business attributes belonging to the bills of material are inputted into the manufacturing enterprise system via the A-source application where analysis and calculations are performed on the inputs.

BRIEF DESCRIPTION OF THE DRAWINGS

The present invention is described below with reference to the following drawing figures of which.

DESCRIPTION OF THE PREFERRED EMBODIMENT

Figure 1:
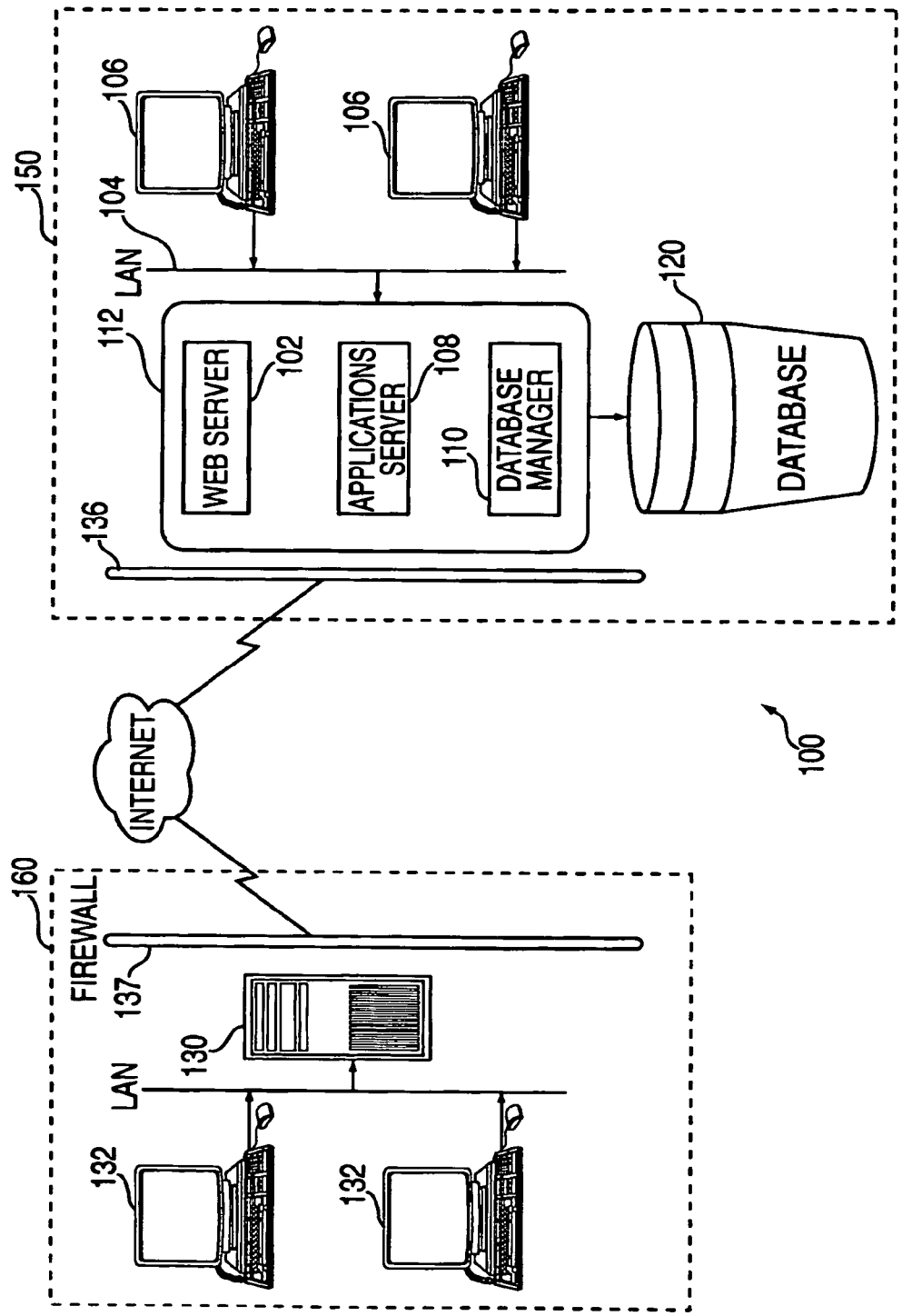
FIG. 1 is a block diagram of a portion of a network system on which the A-source application is executed in an exemplary embodiment of the present invention.

The A-Source tool of the present invention automates supply chain processes which aids in streamlining the manufacturing process. It involves automating and refining the requests for quote (RFQs) and requests for price updates processes between an OEM and its supply chain partners allowing the OEM to identify cost savings opportunities and make instant business decisions before and throughout its manufacturing cycle. The A-source tool enables an OEM to create a complete bill of materials, including part numbers, descriptions, a list of approved suppliers, quantities and attachments (such as technical drawings, terms and conditions). The information is then placed on the OEM's web site and potential suppliers who wish to work on the project are notified and can provide their responses to the OEM via the Internet. The A-source tool is used when the OEM purchases selected complete products from contract manufacturers who procure and assemble the components. The application offers the OEM the ability to identify cost-saving opportunities by comparing its component costs from original manufacturers vs. a contract manufacturer's purchase price for the same component. The A-source tool includes a bridging component, or parts requirement planning (PRP) component, which is a bridging application that allows disparate business applications run by supply chain entities to communicate with one another. Many of the data inputs provided to the A-source tool may not be compatible with existing enterprise software, thus, the PRP component provides the mechanism by which the two data types can be integrated. The PRP tool also allows OEMs to identify parts by 'business attributes' rather than solely by physical or configuration characteristics. Business attributes include key data such as whether a part is subject to consignment, whether a part is price masked, and whether a part is subject to a buy-off contract, and/or direct rebate program. They are employed by the OEM as part of its price protection techniques and are used to cut costs via the A-source application. These terms are defined as follows:

Direct Rebate: The OEM directs a contract manufacturer to buy strategic parts from an approved supplier that participates in the OEM's direct rebate process. The supplier sells directly to the contract manufacturer, then rebates the difference between the selling (market) price and the OEM contract price to the OEM.

OEM Consigned Parts: The OEM buys strategic parts directly from an approved supplier. The OEM then consigns these parts to a contract manufacturer.

Buying off an OEM contract: The contract manufacturer must have the approval of the respective commodity council and the component supplier prior to executing this technique. The contract manufacturer buys required parts directly from an approved OEM parts supplier at the OEM negotiated price.

Price Masked: 1) Outsourced supply chain team buys off production procurement council's negotiated contracts at the OEM price and sells to a contract manufacturer at an uplifted market price. 2) Outsourced supply chain team rebates the difference between the 'buy' price and the 'sell' price to the OEM division purchasing the assembly from the contract manufacturer. Parts are determined to be price masked if any one of the following criteria is met: a) OEM has a technology dependence/vested interest/influence; or b) OEM has a supply continuity leverage/advantage.

Applying business attributes to BOM items aids the OEM in its decision making processes. By automating the bidding process and keying critical BOM data with specified business attributes, the OEM is able to dramatically reduce production costs and make instant business decisions, thereby passing the savings on to customers.

The following illustrates the structural and operational aspects of the present invention:

In terms of structure, reference is now made to FIG. 1. Therein depicted is a block diagram representing a network system 100 for implementing the A-source tool of the present invention. System 100 includes a manufacturing enterprise 150 comprising a web server 102 that is located on host system 112 and connected through a network 104 to terminals 106. The terms, "manufacturing enterprise" and "OEM" are used interchangeably throughout this description. Network 104 may comprise a LAN, a WAN or other network configuration known in the art. Further, network 104 may include wireless connections, radio based communications, telephony based communications, and other network-based communications. Applications server 108 and database manager 110 are also located on host system 112 and are in communication with web server 102 and network 104. Any web server software or similar program that handles general communications protocols and transport layer activities could be used as appropriate for the network protocol in use. A firewall 136 or other security device limits access to manufacturing enterprise 150 to network users with proper authorization.

Host system 112 may be an IBM® S/390 system or other suitable computer. Host system 112 is running suitable web server software designed to accommodate various forms of communications, including voice, video, and text. For purposes of illustration, host system 112 is running Lotus Domino(™) and Lotus Notes(™) as its groupware applications software, however, any compatible e-mail-integrated collaborative software could be used. Applications server 108 executes the A-source tool of the present invention. The A-source application may be one of many business applications employed by manufacturing enterprise 150 which, in combination, constitute its Enterprise Resource Planning and Materials Requirements Planning suites described above.

Data storage device 120 is any form of mass storage device configured to read and write database type data maintained in a file store (e.g., a magnetic disk data storage device). Of course, it will be appreciated that data storage device 120 may be one that consists of multiple disk sub-systems which may be geographically dispersed and coupled via network architecture. There is no positive requirement that data storage device 120 be maintained in one facility; to the contrary, the volume of information stored therein may dictate geographical dispersion and the like. All that is required is that data storage device 120 be logically addressable as a consolidated data source across a distributed environment such as a network system. The implementation of local and wide-area database management systems to achieve the functionality of data storage device 120 will be readily understood by those skilled in the art. Information stored in data storage device 120 is retrieved and manipulated by database manager 110. For purposes of illustration, database manager 110 is utilizing IBM's DB/2® software.

Data storage device 120 provides a repository for a library of documents created and utilized by the A-source tool. Also stored in data storage device 120 is a catalog or collection of tables used by the PRP bridging component of the A-source tool in order to reformat various types of data and integrate data received from different sources as will be explained further herein. Documents stored in data storage device 120 include lists of approved suppliers/manufacturers, A-source activity log reports and miscellaneous reports, as well as general supplier and product information. The A-source activity log is described further herein.

Supplier enterprise 160 comprises web server 130 that connects terminals 132 to intranet 134 and to the Internet. Firewall 137 provides security and protection against unauthorized access to internal network information from outside sources as well as controlling the scope of access to manufacturing enterprise system's 150 data. Terminals 132 may access web server 130 via internal web browsers located on terminals 132 (not shown). Supplier enterprise 160 may be an existing or prospective supply chain partner of manufacturing enterprise 150 and may be a supplier or contract manufacturer. Although not shown in FIG. 1, system 100 may include a plurality of suppliers and contract manufacturers in communication via the Internet or related networking technologies.

The A-source tool of the present invention is an e-business application that allows manufacturing enterprise 150 to submit requests for quote (RFQs) and requests for price updates to a contract manufacturer and/or supplier of supplier enterprise 160 and have them respond over the Internet. The application analyzes the inputs to identify cost savings opportunities, thereby improving volume purchasing leverage, increasing productivity, and reducing time to market as a result of electronic data exchange.

Figure 2A:
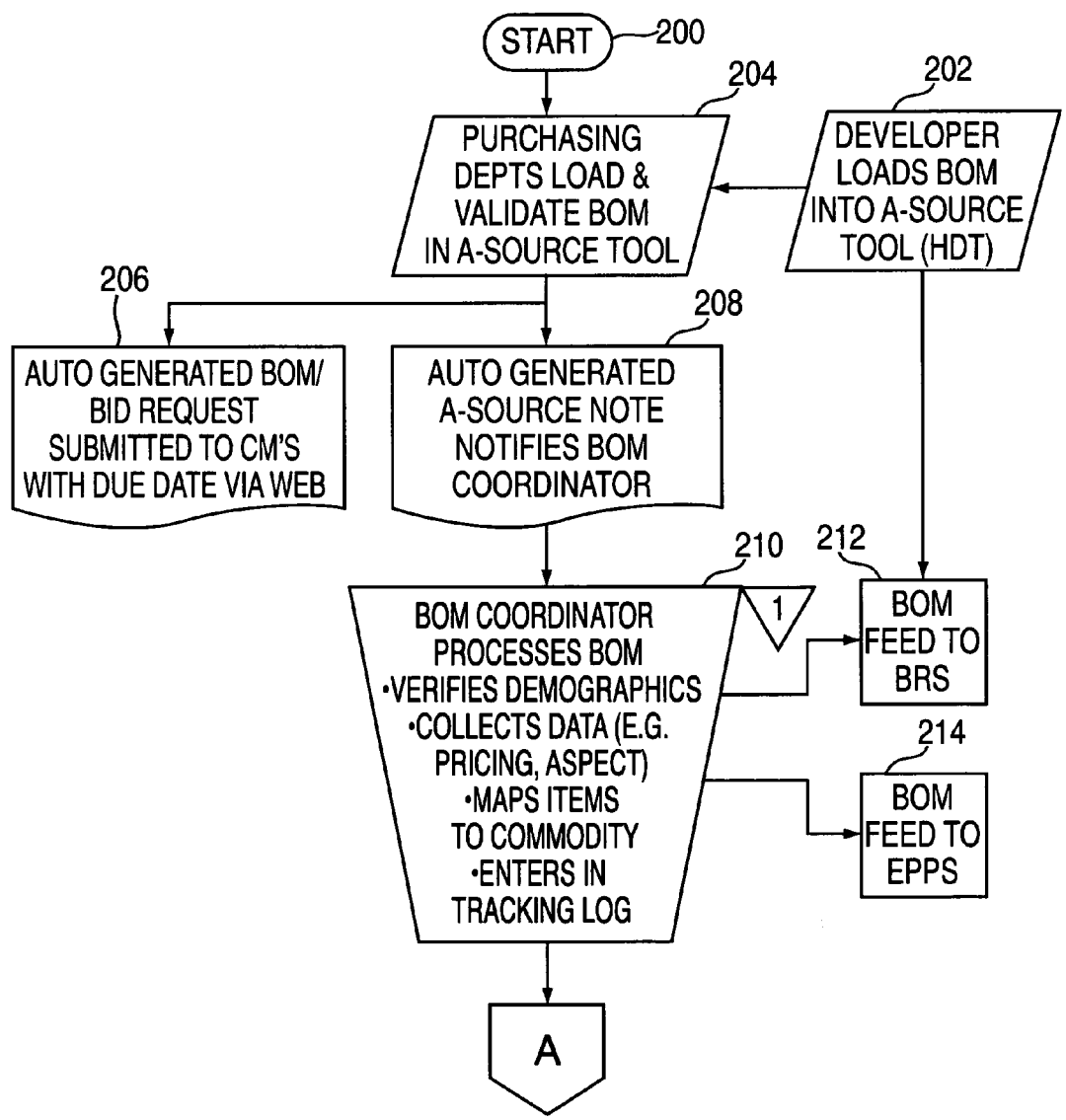
FIGS. 2A–2G represent a flowchart of the A-source bidding process.

The A-source RFQ/bidding process is initiated at step 200 of FIG. 2A. The developer at manufacturing enterprise 150 loads a BOM file into the A-source tool via a hardware development tool (HDT) at step 202 which, in turn, is fed to a bill of material review group (BRS) at step 212. A BOM file is a list of parts or components required for the assembly of a specified product and includes descriptive information pertaining to the parts, as well as quantities and pricing information. Alternatively, one or more specified purchasing departments within manufacturing enterprise 150 may load and validate a BOM file into the A-source tool at step 204. The A-Source application automatically generates a BOM bid request for the BOM file and submits it to supplier enterprise 160 via web server 102 along with a due date for response at step 206. At the same time, the A-source tool notifies a BOM coordinator of manufacturing enterprise 150 of the bid request and sends a duplicate of the BOM file at step 208. The BOM coordinator acts as a liaison between the various divisions or departments within manufacturing enterprise 150 which are involved with a particular BOM file. Once notified, the BOM coordinator processes the BOM file at step 210. This process includes verifying demographic information, collecting data pertaining to pricing and items listed in external data warehouse files, and mapping these items to a commodity. The date in which the BOM coordinator receives this notice is automatically recorded in an activity log provided by the A-source application and is represented in FIG. 2A as Flag 1. The A-source activity log is a means to track the progress of each BOM file as it is transmitted and processed through the system. Data recorded in the A-source activity log is stored in data storage device 120.

Once the BOM file is processed, the results are fed to a bill of material review group at step 212 and to the enterprise production and planning system (EPPS) at step 214. Enterprise production and planning system (EPPS) is a component of the central planning system of FIG. 5 and is used as a front end engine that operates on the processed BOM file consolidating and associating the data contained therein with related data from other sources. The BOM coordinator then sends notification by Lotus Notes (™) to a cost analysis review team indicating that the BOM file has been processed and identifies a quote due date at step 216 of FIG. 2B. The A-source activity log records the date that this notice is sent at Flag 2. Coinciding with this notification to the cost analysis review team is a separate cost analysis pertaining to microelectronics components by a purchasing division of manufacturing enterprise system 150 at step 217. Relevant marketing data is collected by a marketing team of manufacturing enterprise system 150 at step 218 and is then delivered to a designated buyer or purchasing division of manufacturing enterprise system 150 where it is reviewed. The microelectronics division (MD) of manufacturing enterprise system 150 manufactures components for internal, as well as external, use. The results of the cost analysis are evaluated along with the results of the cost analyses performed in steps 219–228 via the A-Source tool, allowing manufacturing enterprise system 150 to further optimize its purchasing decisions. Marketing has general knowledge of which components manufactured by manufacturing enterprise system 150 are in demand by customers and how many are needed at any given time. This information allows manufacturing enterprise system 150 to compare pricing, demand and availability of components produced internally to similar components offered by outside sources.

Figure 2B:
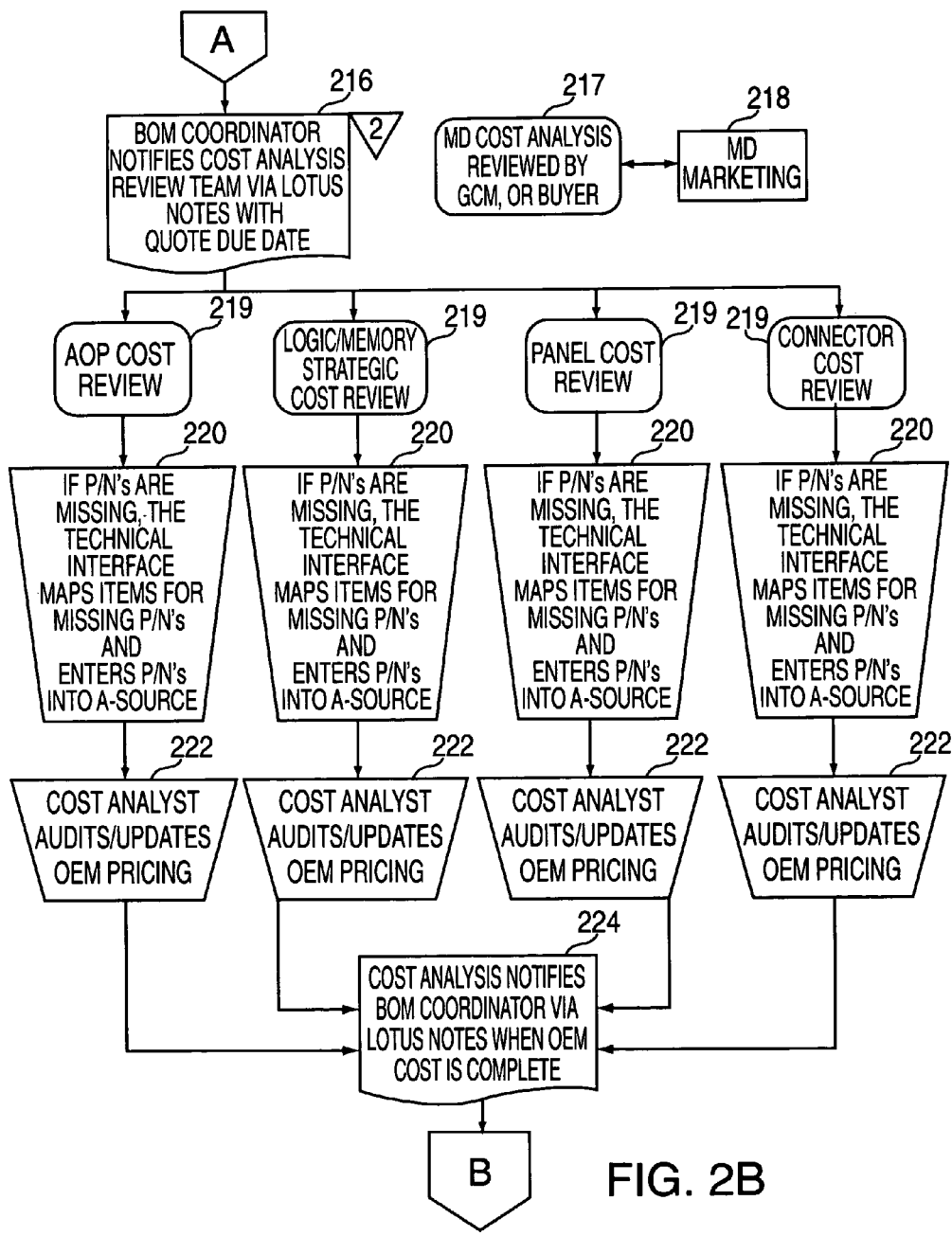
Figure 2C:
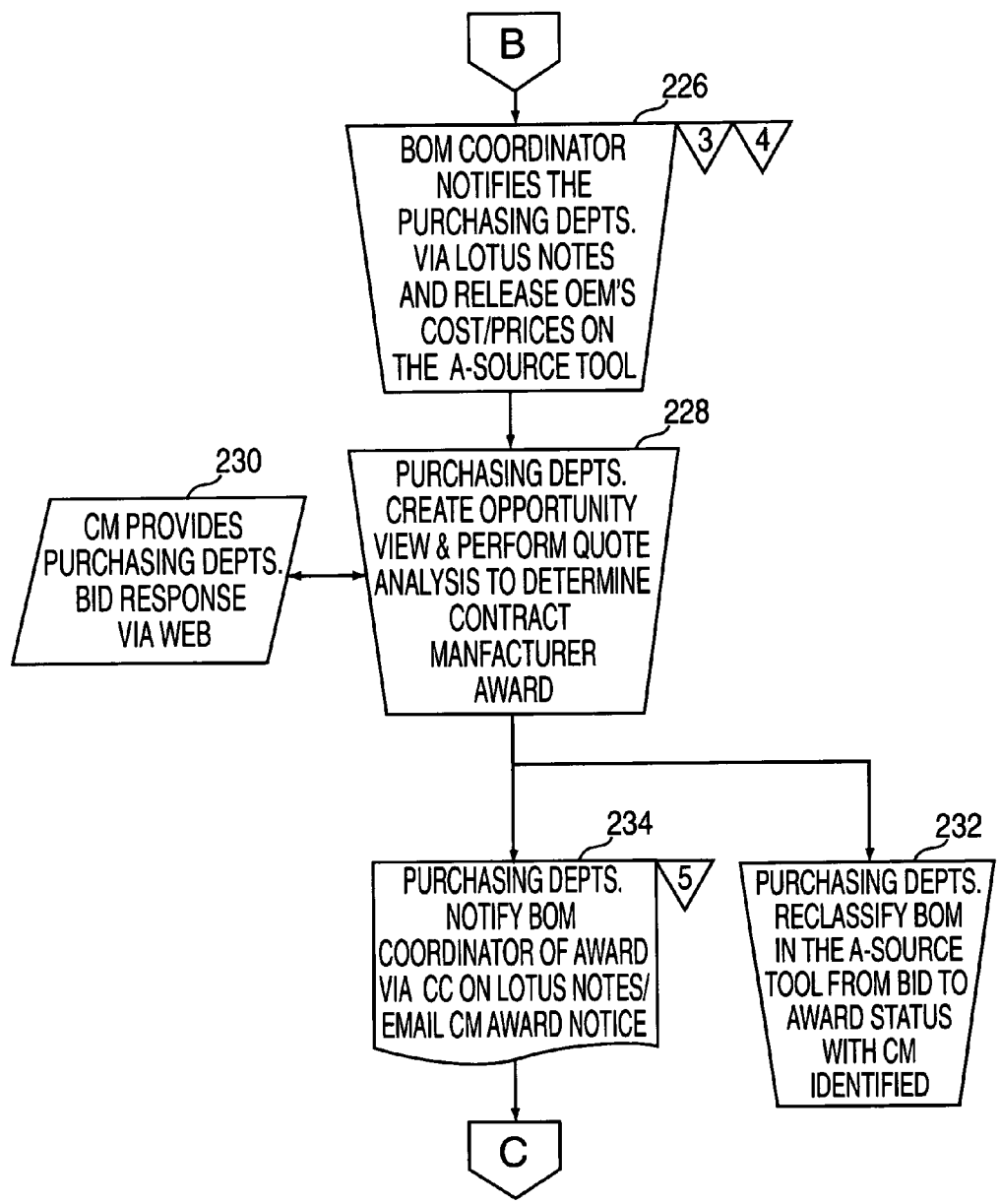

The cost analysis review team is comprised of four financial or accounting departments/divisions and may be defined by manufacturing enterprise 150 via the A-source tool. Additionally, there may be more than or fewer than four financial departments specified. For purposes of illustration, the four departments illustrated in FIG. 2B are 'Active Optics Passes Cost Review Department' (AOP), 'Logic/Memory Strategic Cost Review Department', 'Panel Cost Review Department', and 'Connector Cost Review Department'. These four departments review the information sent by the BOM coordinator at step 219. If part numbers relating to the items listed on the BOM are missing, a technical interface maps items for missing part numbers and enters these numbers into the A-source tool at step 220. The technical interface process may be implemented by a representative of manufacturing enterprise system 150 utilizing a technical database or technical manual to map the missing part numbers to the respective BOM items. The cost analyst for each department audits the completed information and updates manufacturing enterprise system's 150 'in house' pricing information accordingly at step 222. All parts listed on the processed BOM are now identifiable by their respective part numbers. Further, accurate updated pricing information for each part on the BOM is available. Upon completion, the cost analyst for each department of the cost analysis review team notifies the BOM coordinator at step 224. The BOM coordinator in turn notifies the purchasing departments via Lotus Notes (™) and releases the completed cost/pricing information on the A-source tool at step 226 of FIG. 2C. The date of release is recorded in the A-source activity log at Flag 3, as well as the date that the BOM coordinator notifies the purchasing departments that the cost analysis is completed at Flag 4. Once the purchasing departments receive a response to the posted BOM bid request on the web site at step 230, they create an 'opportunity view' and perform a 'quote analysis' in order to determine the contract manufacturer award at step 228. The opportunity view and quote analysis provide a standardized layout of the response data from each of the contract manufacturers at that allows for easy comparison by the purchasing departments. These departments then reclassify the BOM in the A-source tool from 'Bid' status to 'Award' status, identifying the selected contract manufacturer at step 232. The departments notify the BOM coordinator of this award via a "cc" or 'carbon copy' procedure on Lotus Notes (™) at step 234. The date that the BOM coordinator is notified of the award is logged into the A-source activity log at Flag 5. The original e-mail or award notice is sent to the contract manufacturer who has been selected to receive the award.

Figure 2D:
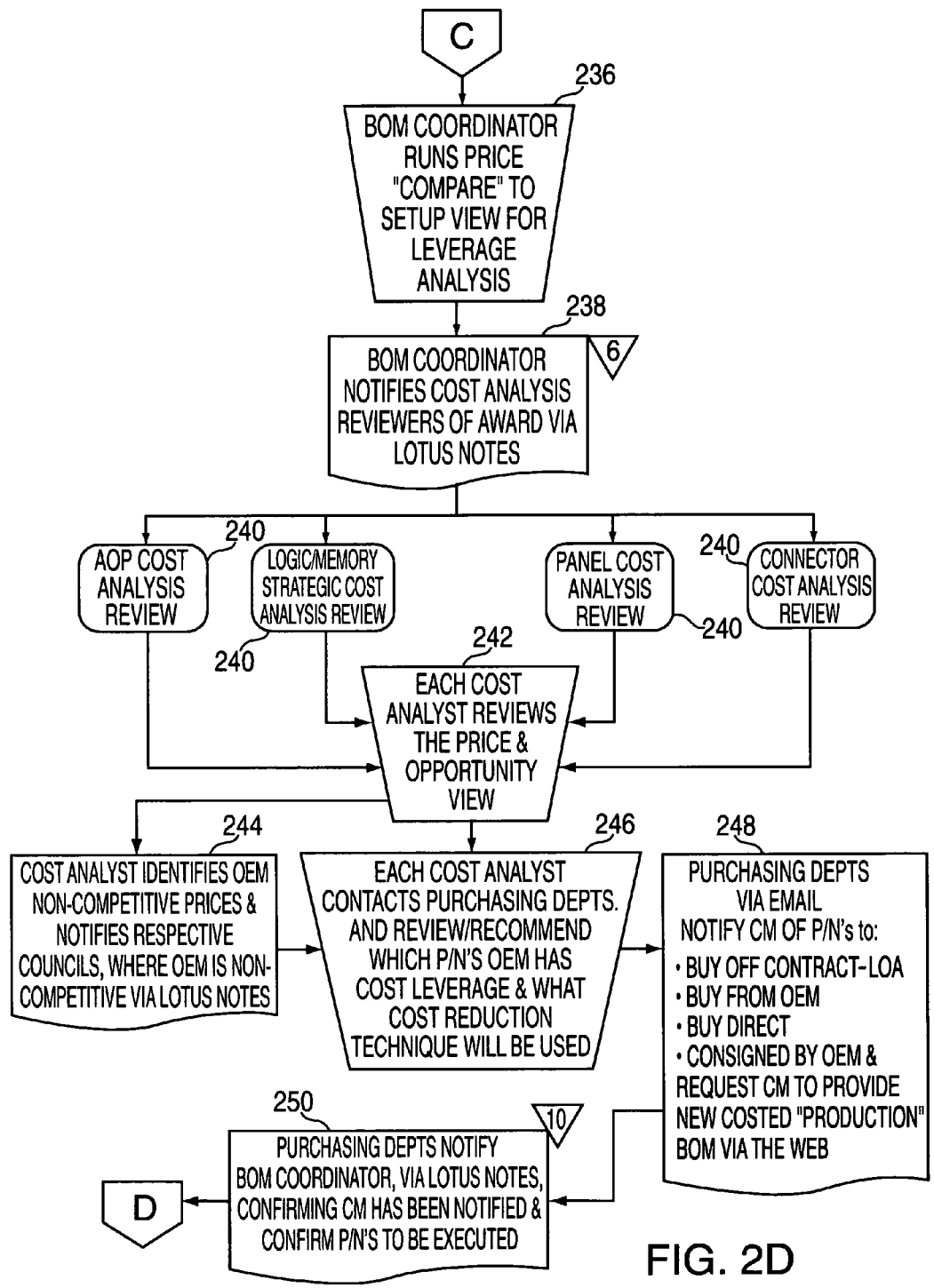

The BOM coordinator runs a price comparison view for leverage analysis at step 236 of FIG. 2D, followed by a notice to the cost analysis review teams of the award via Lotus Notes (™) at step 238. The date of this notice is recorded in the A-source activity log at Flag 6. The price comparison view allows manufacturing enterprise 150 to compare its pricing and availability information relating to each part number on the BOM file to the pricing and availability information supplied by the contract manufacturer of supplier enterprise 160 in its response to the bid/RFQ received. The cost analysis review team performs a cost analysis review of the items in the notice that pertain to each of the departments at step 240. Each cost analyst then reviews the price and opportunity view at step 242. This process is enabled by the PRP bridging component of the A-source tool as explained above. The process is described in further detail in FIGS. 5 and 6. The cost analyst identifies internal non-competitive prices and notifies the respective councils, where manufacturing enterprise system 150 is non-competitive via Lotus Notes (™) at step 244. Each cost analyst contacts the respective purchasing departments and reviews and/or recommends which part numbers the organization has cost leverage for and what cost reduction technique will be used at step 246. The purchasing departments then notify the contract manufacturer via e-mail at step 248 specifying those part numbers containing business attributes that are subject to the price protection techniques defined above. For example, the e-mail message might direct the contract manufacturer of supplier enterprise 160 to procure a part that is incorporated into manufacturing enterprise system's 150 direct rebate program. This contract manufacturer would then procure this part from a pre-approved supplier that participates in manufacturing enterprise system's 150 direct rebate plan. The contract manufacturer pays market price for the part while the difference between the market price and the manufacturing enterprise's contract price is rebated to manufacturing enterprise system 150. These purchasing departments also request that the contract manufacturer provide a new costed 'Production' BOM via the Web. This Production BOM process is further described in FIG. 3. Next, the purchasing departments notify the BOM coordinator via Lotus Notes (™), confirming that the contract manufacturer has been notified and confirms the part numbers to be executed at step 250. The date in which the BOM coordinator is notified is recorded in the A-source activity log at Flag 10.

Figure 2E:
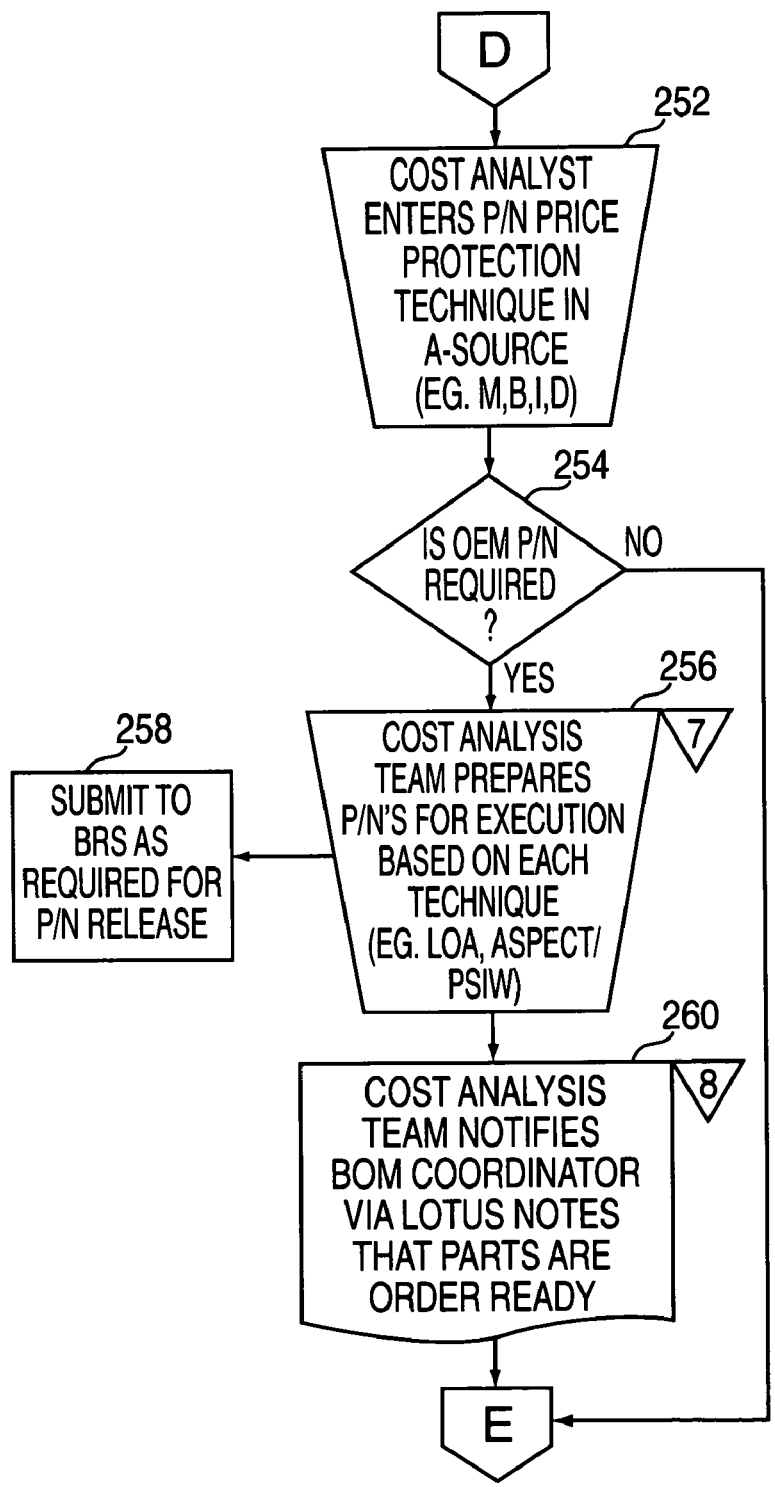

The cost analyst enters a price protection technique for a selected part number in the A-source tool at step 252 of FIG. 2E. At step 254, the system is queried to see whether an 'in house' part number is required. This information is required where the part is identified by more than one number. An example is where the OEM catalogs and identifies parts 'in house' and not according to industry standards or global identifiers. Thus, a contract manufacturer/supplier may identify the same part by a different number. If an 'in house' part number is required, flow proceeds to step 256 where the cost analysis review team prepares part numbers for execution based upon each price protection technique. The date the team begins to prepare part numbers for execution is recorded in the A-source activity log at Flag 7. This information is passed on to the bill of material review group as required for release of part numbers at step 258. The cost analysis review team notifies the BOM coordinator via Lotus Notes (™) that the part numbers are now 'order ready' at step 260. The date of this notification is recorded in the A-source activity log at Flag 8.

Figure 2F:
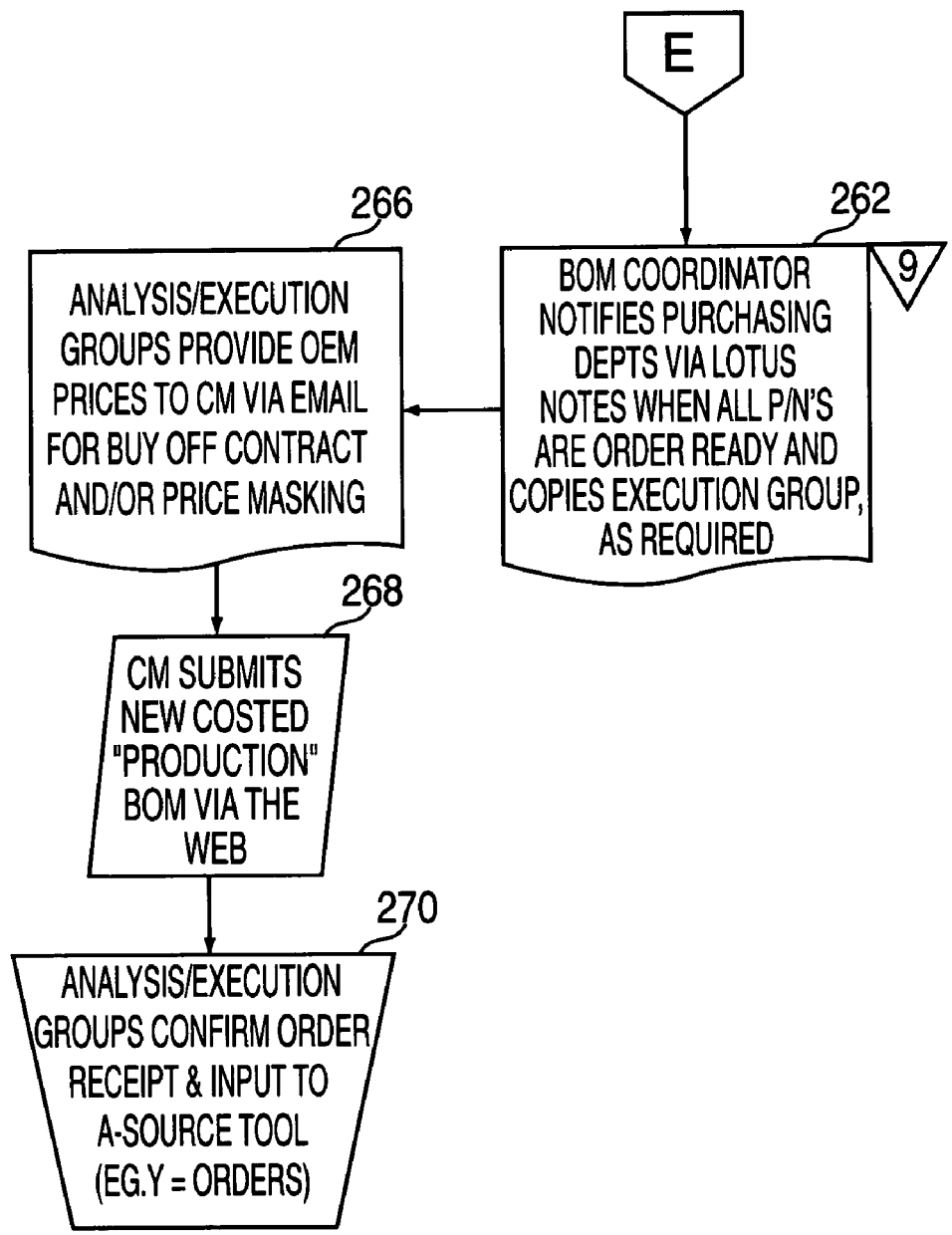

Once the part numbers are 'order ready', or alternatively, if no part number is required, flow proceeds to step 262 of FIG. 2F where the BOM coordinator notifies the purchasing departments via Lotus Notes (™) that all part numbers are order ready and copies the execution group as required. The date of this notice is subsequently recorded in the A-source activity log at Flag 9. The analysis/execution groups provide 'in house' prices to the contract manufacturer via e-mail for items subject to a 'buy off' contract and/or 'price masking' at step 266. The contract manufacturer submits a new costed 'Production' BOM via the Web to the analysis/execution groups at step 268. The analysis/execution groups confirm the order receipt for the contract manufacturer and input the order into the A-source tool at step 270.

Figure 2G:
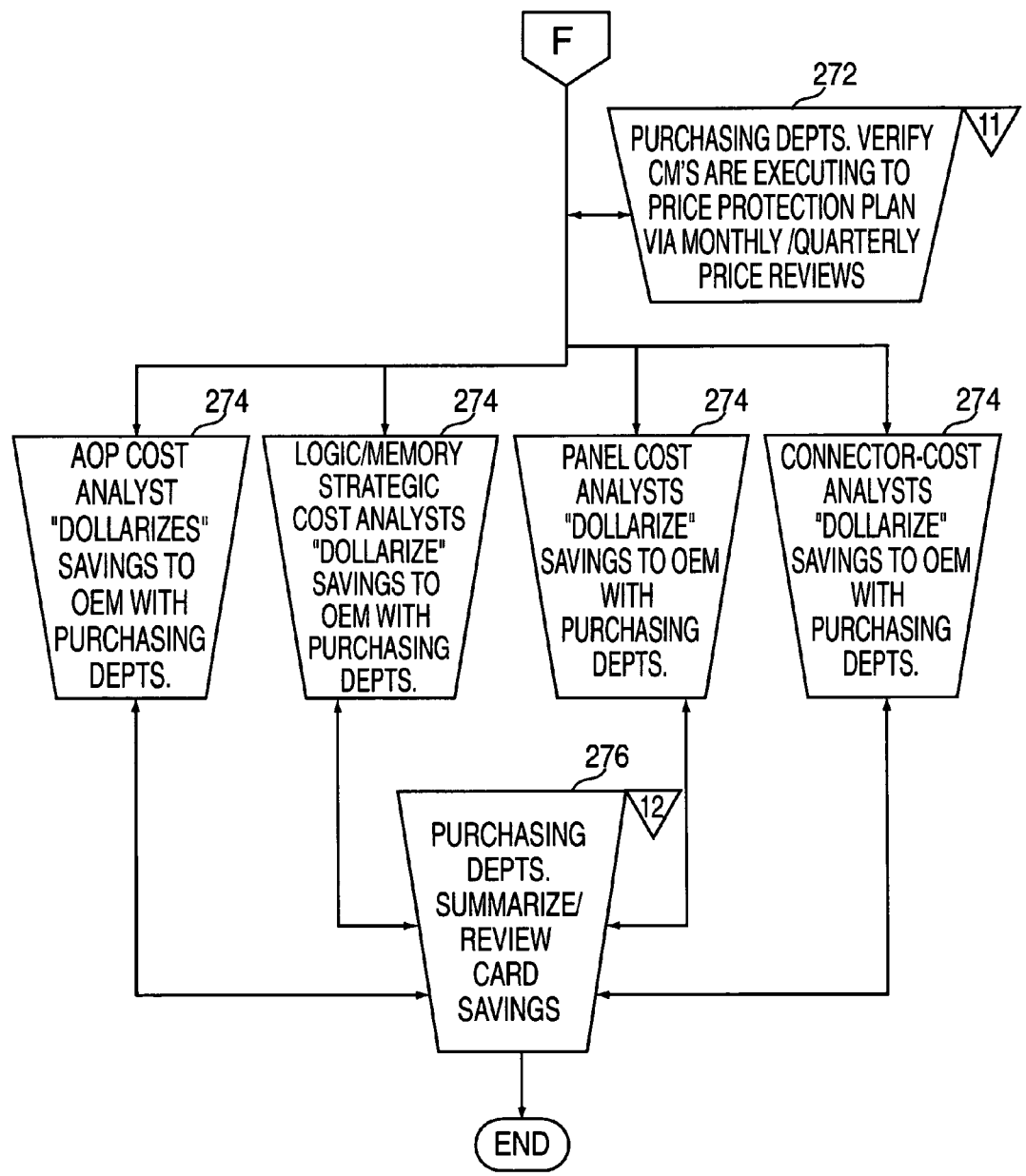

The purchasing departments verify that contract manufacturers are complying with the price protection plan via monthly or quarterly price reviews at step 272 of FIG. 2G. The cost analysis review team "dollarizes" or measures the savings to manufacturing enterprise 150 with the purchasing departments at step 274. These departments summarize/review the savings with the cost analysis review team at step 276.

Figure 3A:
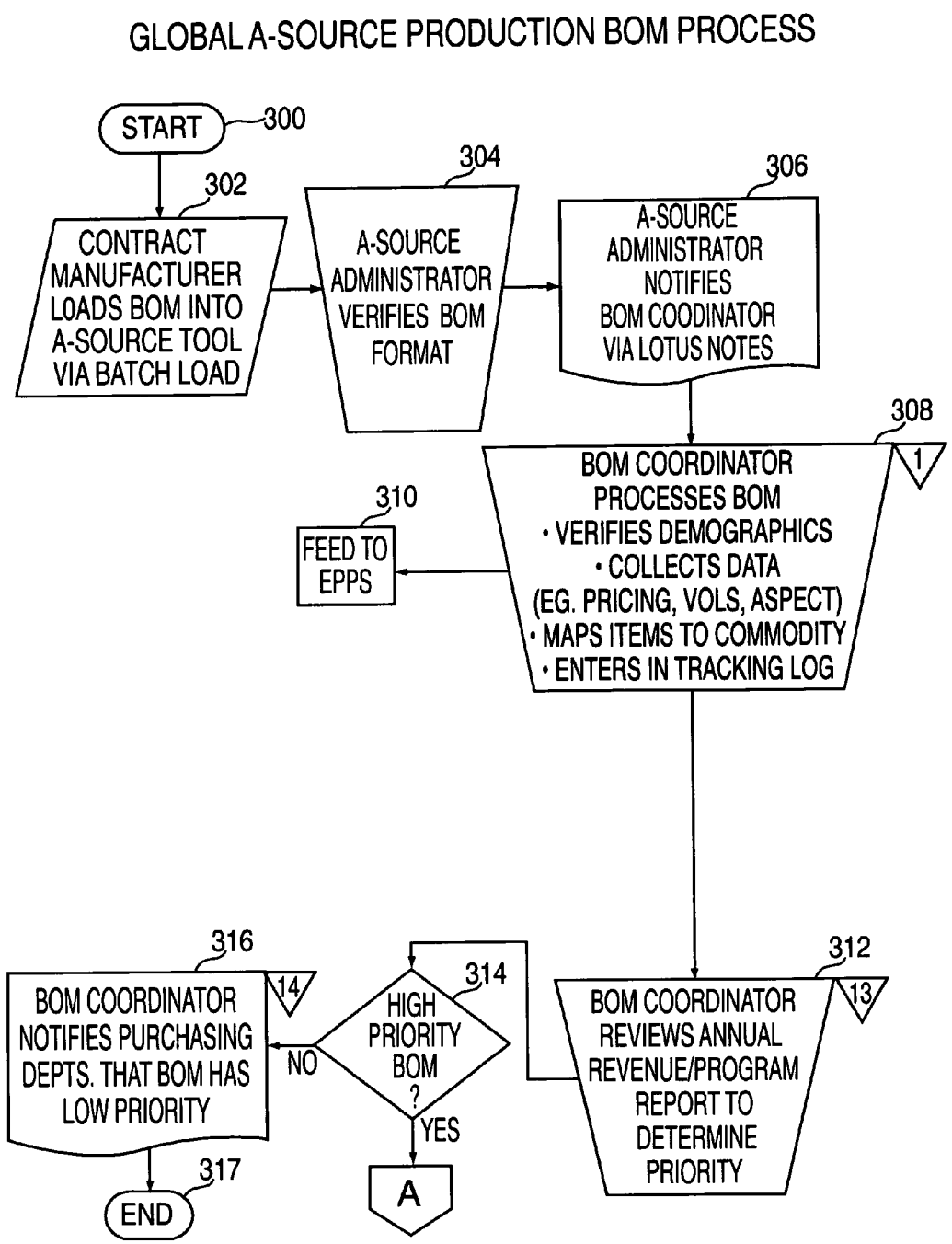
FIGS. 3A–3F represent a flowchart of the A-source production BOM process.
Figure 3B:
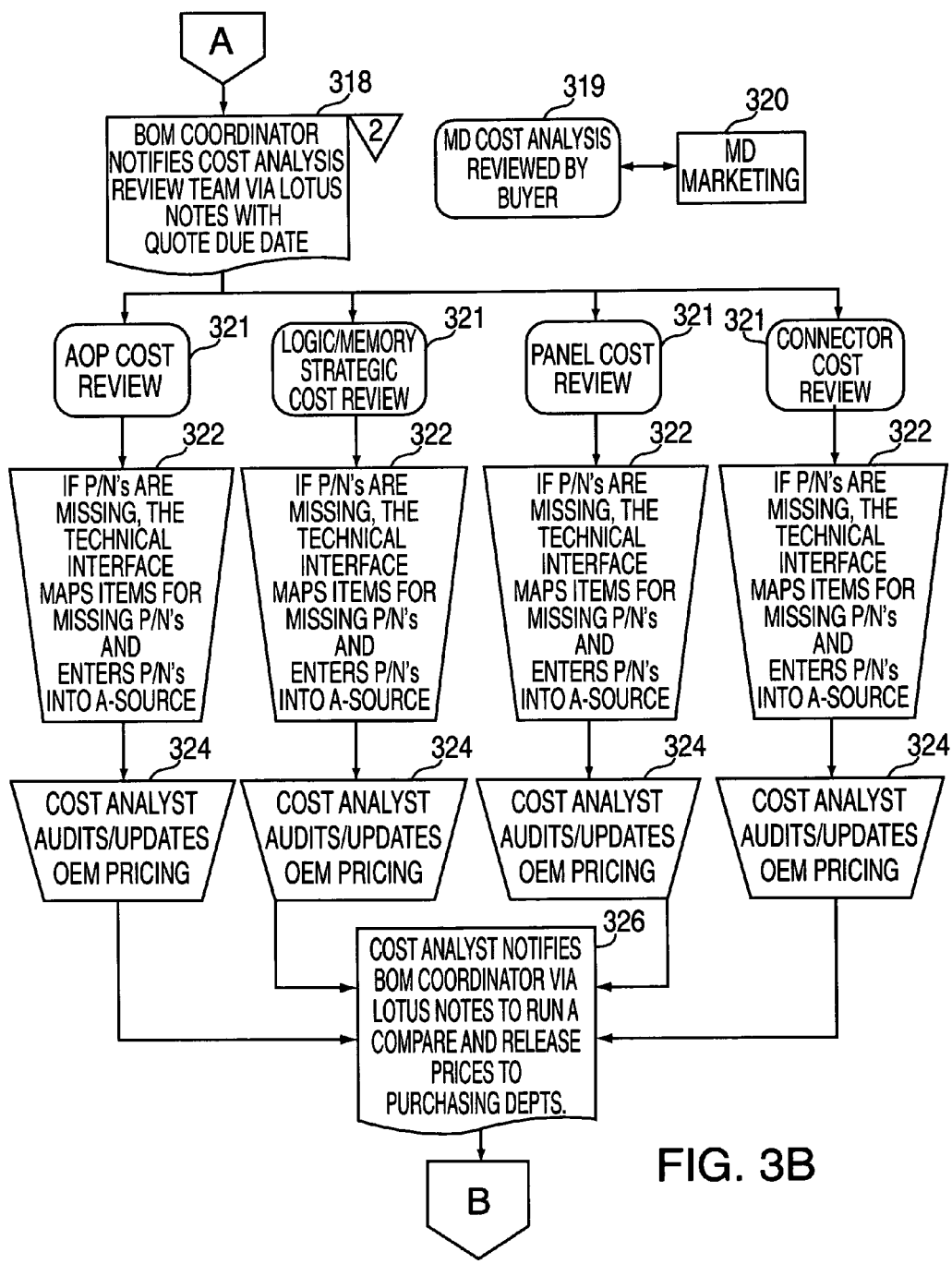
Figure 3C:
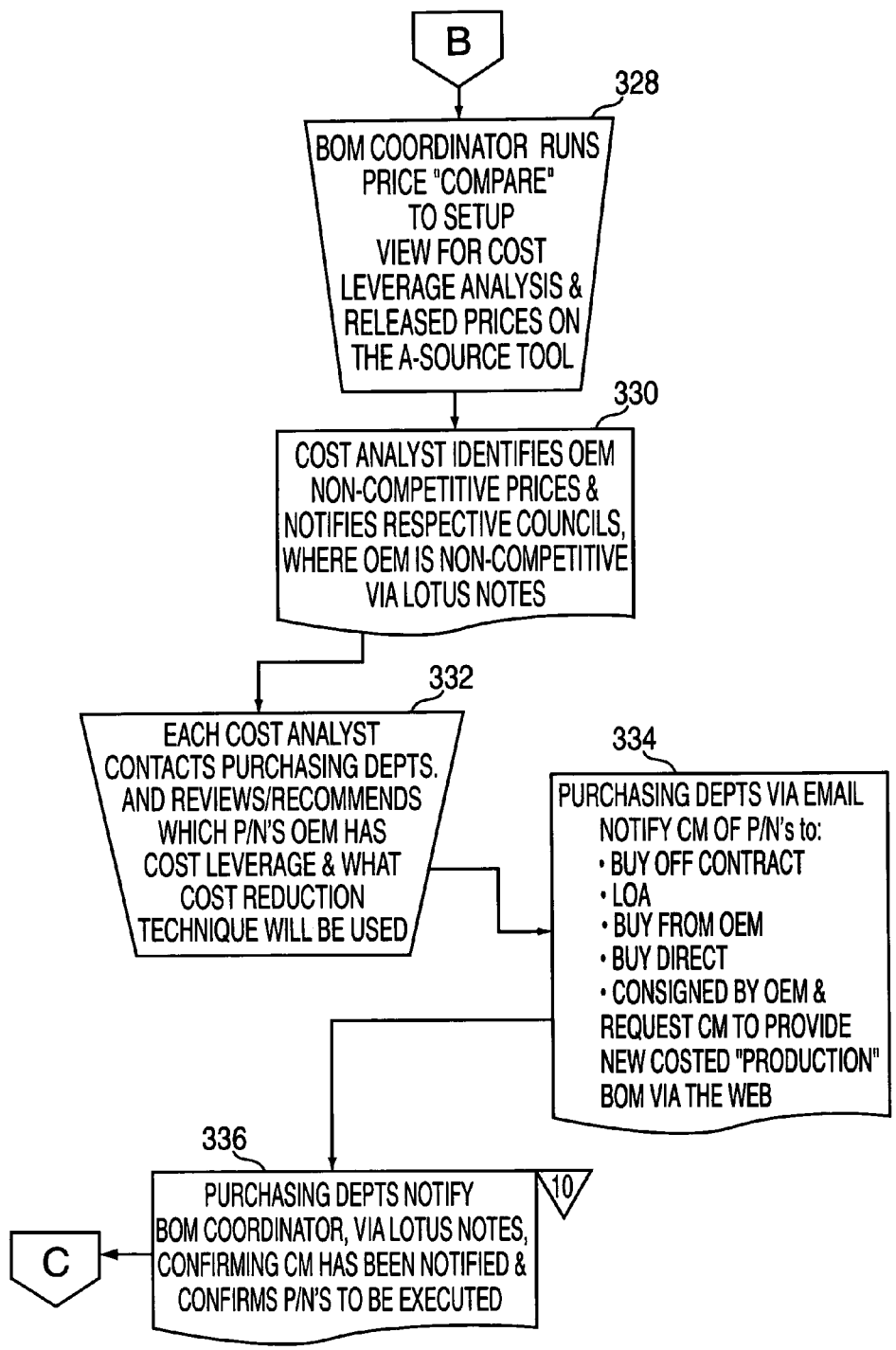
Figure 3D:
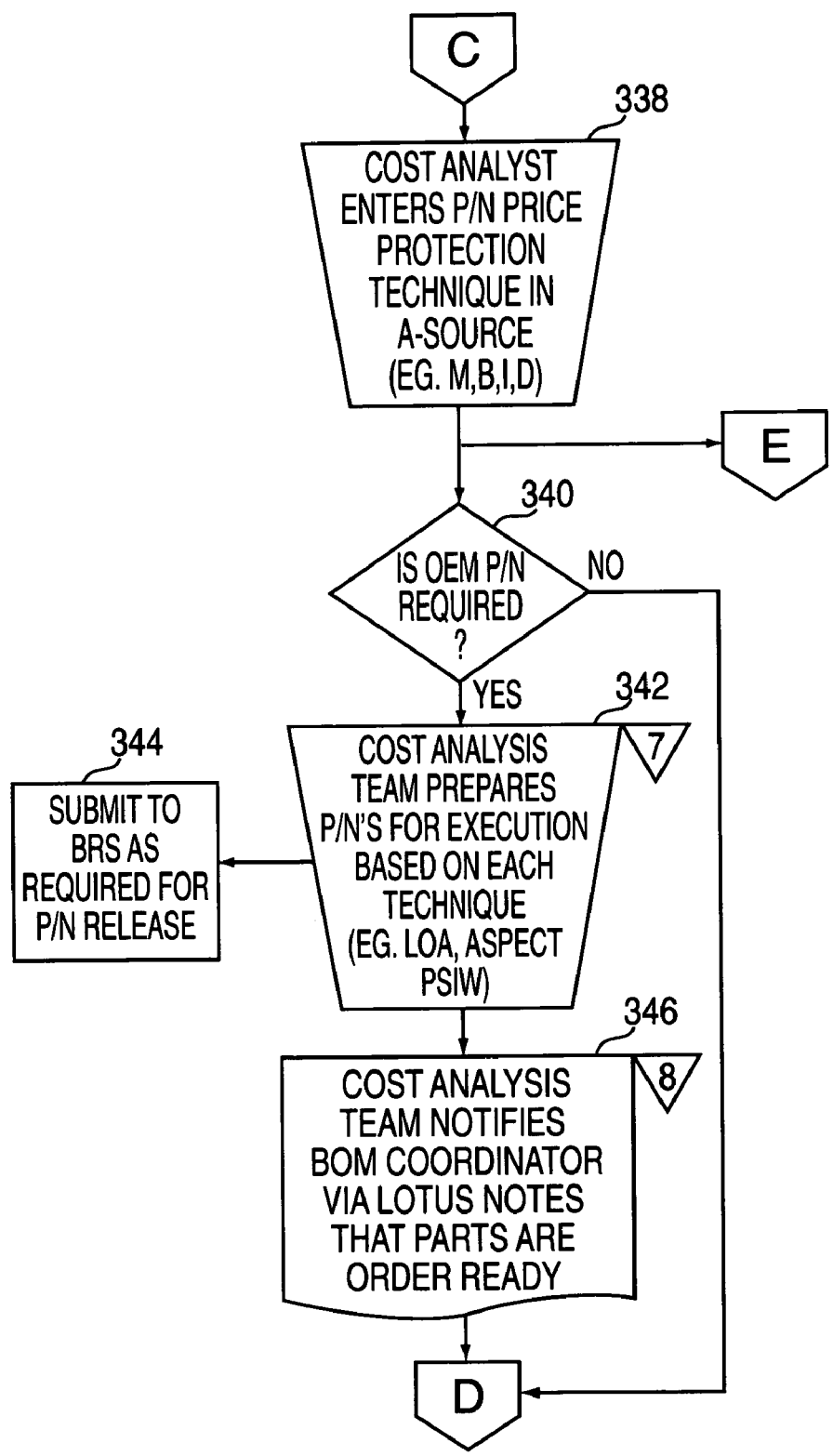
Figure 3E:
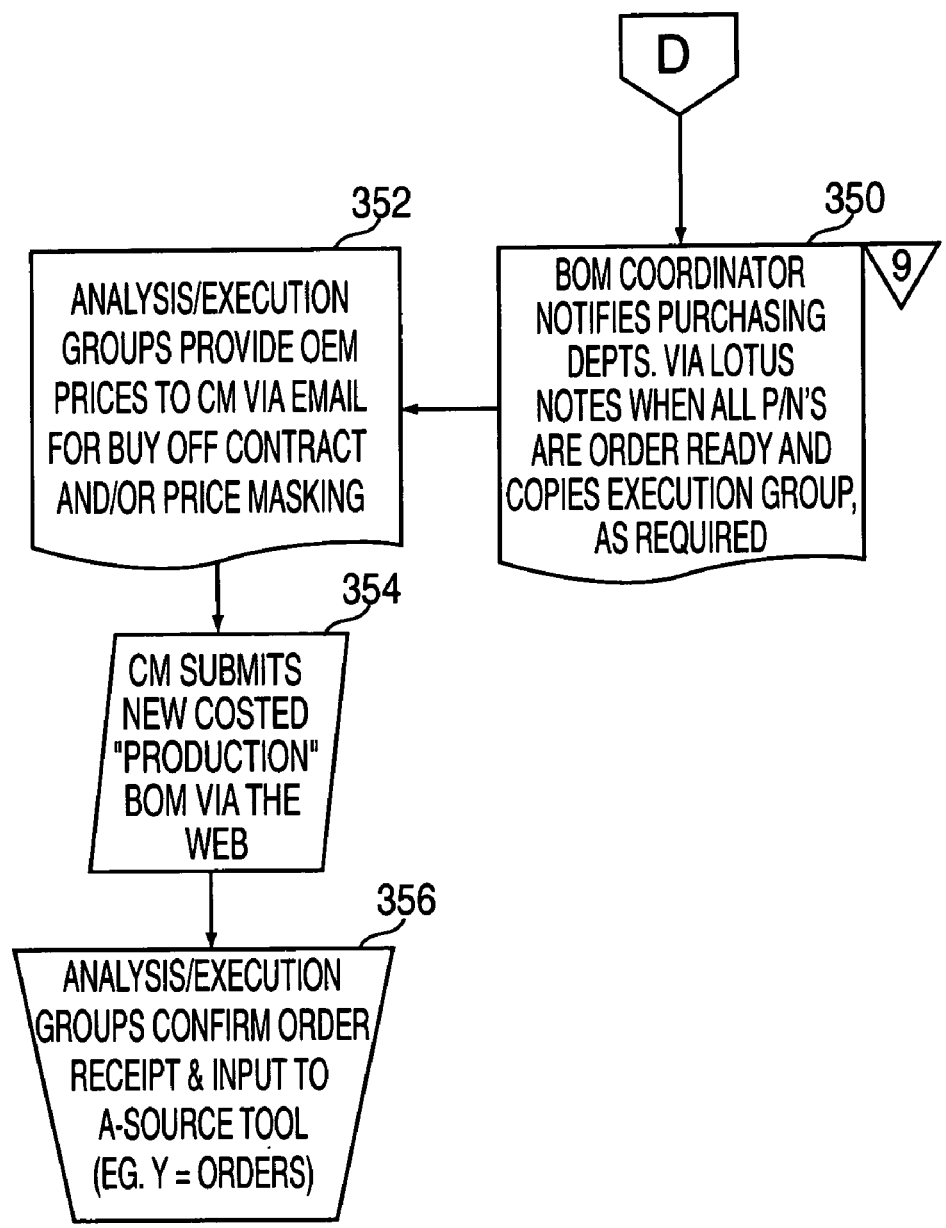

Referring now to FIG. 3A, the Production BOM process for the A-Source tool begins at step 300. A contract manufacturer loads a BOM file into the A-source tool via batch load procedure from supplier enterprise 160 at step 302. The A-source administrator of manufacturing enterprise system 150 verifies the BOM format at step 304 and then notifies the BOM coordinator via Lotus Notes (™) at step 306. The BOM coordinator processes the BOM file at step 308. This processing includes verifying demographics; collecting data relating to pricing, volumes, and items listed in external data warehouse files; mapping items to commodity; and entering this information in a tracking log stored in data storage device 120. The date that the BOM coordinator receives the BOM is recorded in the A-source activity log at Flag 1. This information is then fed into the EPPS of manufacturing enterprise 150 at step 310. The BOM coordinator then reviews an annual revenue/program report to determine whether or not the BOM should have a high priority at step 312. The A-Source Production BOM is updated with division, location, and other information relating to the respective purchasing department. At step 314 a determination of priority is calculated. If the priority is not high, flow proceeds to step 316 where the BOM coordinator notifies the respective purchasing departments that the BOM has low priority. The BOM coordinator runs an extended BOM cost report monthly and reviews the information to determine BOM priority. The date of the report is recorded in the A-source activity log at Flag 14 and the process ends at step 317. If, on the other hand, the priority is calculated to be high, flow proceeds to step 318 of FIG. 3B where the BOM coordinator notifies the cost analysis review team via Lotus Notes (™) along with a quote due date. The date that the BOM coordinator releases the cost analysis review information to the cost analysis review team is recorded in the A-source activity log at Flag 2. A microelectronics cost analysis occurs at steps 319 and 320 and is similar to that described in FIG. 2; therefore, it will not be explained in further detail.

At step 320, the cost analysis review team performs a cost review analysis of the BOM information. At step 322, a technical interface maps items for missing part numbers and enters them into the A-source tool. The cost analysis review team audits and updates the OEM pricing information at step 324 and then notifies the BOM coordinator via Lotus Notes (™) to run a comparison and price release report to the purchasing departments at step 326. Accordingly, the BOM coordinator runs a price comparison view for cost leverage analysis and released prices on the A-source tool at step 328 of FIG. 3C. The cost analyst identifies OEM non-competitive prices and notifies respective commodity councils where the OEM is non-competitive via Lotus Notes (™) at step 330. Each cost analyst contacts the purchasing departments and reviews and/or recommends which part numbers the OEM has cost leverage for and what cost reduction technique will be used at step 332. The purchasing departments notify the contract manufacturer via e-mail specifying the part numbers with business attributes subject to the price protection techniques defined earlier, and requests that the contract manufacturer provide a new costed 'Production' BOM via the Web at step 334. These departments then notify the BOM coordinator, via Lotus Notes (™), confirming that the contract manufacturer has been notified and confirms those part numbers to be executed at step 336. The date these departments notify the BOM coordinator is recorded in the A-source activity log at Flag 10. The cost analyst then enters the part number price protection technique in the A-source tool at step 338 of FIG. 3D.

At step 340, the A-source tool checks to see if an OEM or 'in house' part number is required. If so, flow proceeds to step 342 where the cost analysis review team prepares part numbers for execution based on each technique. The date the cost analysis review team begins to prepare part numbers for execution for each technique is recorded in the A-source activity log at Flag 7. This information is submitted to the bill of material review group as required for part number release at step 344. The cost analysis review team notifies the BOM coordinator via Lotus Notes (™) that part numbers are 'order ready' at step 346. The date the cost analysis review team notifies the BOM coordinator that the part numbers are order ready is recorded in the A-source activity log at Flag 8. At step 350 of FIG. 3E, the BOM coordinator notifies the purchasing departments via Lotus Notes (™) when all part numbers are order ready and copies the execution group as required. This date is recorded in the A-source activity log at Flag 9. At step 352, the analysis/execution groups provide OEM prices to the contract manufacturer via e-mail for a 'buy off' contract and/or 'price masking'. The contract manufacturer submits the new costed Production BOM via the Web at step 354. The analysis/execution groups confirm order receipt and input to the A-source tool at step 356. For example, the input might be a 'Y' in the "Orders" field.

Figure 3F:
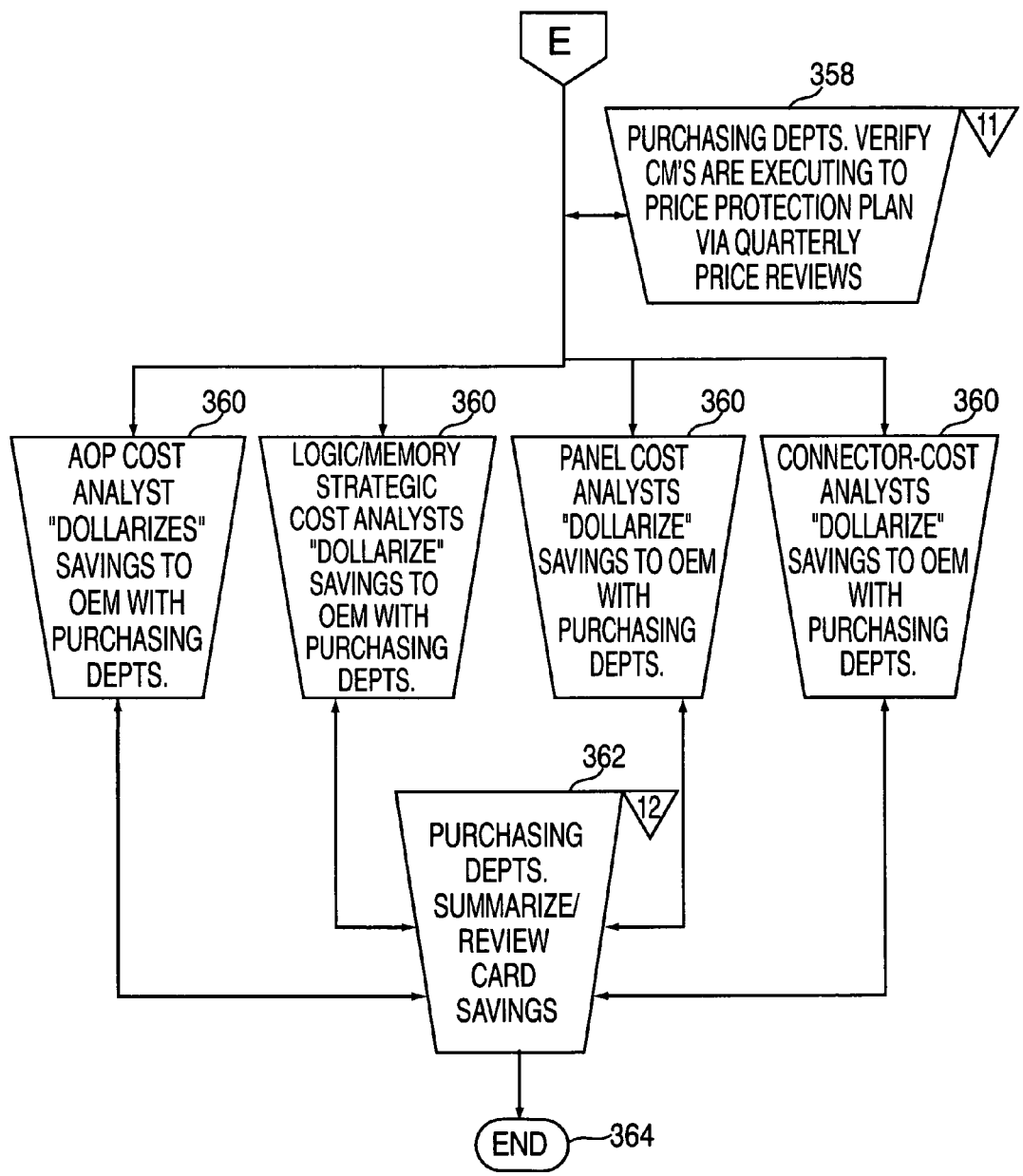

The purchasing departments periodically verify that the contract manufacturer is executing according to the price protection plan technique via quarterly price reviews at step 358 of FIG. 3F. Each of the cost analyst review team members "dollarize" the savings to the OEM with the purchasing departments at step 360. At step 362, the purchasing departments summarize/review the savings and the process ends at step 364.

The A-source application standardizes and simplifies the process of exchanging component pricing information with contract manufacturers, enabling the manufacturing enterprise to quickly evaluate bids, ensure that their suppliers are paying the lowest possible prices for parts, and make accurate, cost-effective buying decisions. This process enhances productivity, provides reduced time-to-market for final items, and lower costs of final products as the contract manufacturers pass along their price savings to the manufacturing enterprise.

The A-source application is executed via workgroup software, such as Lotus Domino(™) and Lotus Notes (™). The information received by the A-source application must be able to be combined with data provided by other applications running on manufacturing enterprise system 150. Oftentimes the database applications and the groupware applications are incompatible. It is helpful if these types of information be integrated in order to achieve the benefits provided by the A-source tool. Accordingly, a bridging component is contained within the A-source tool which provides this integration.

Figure 4:
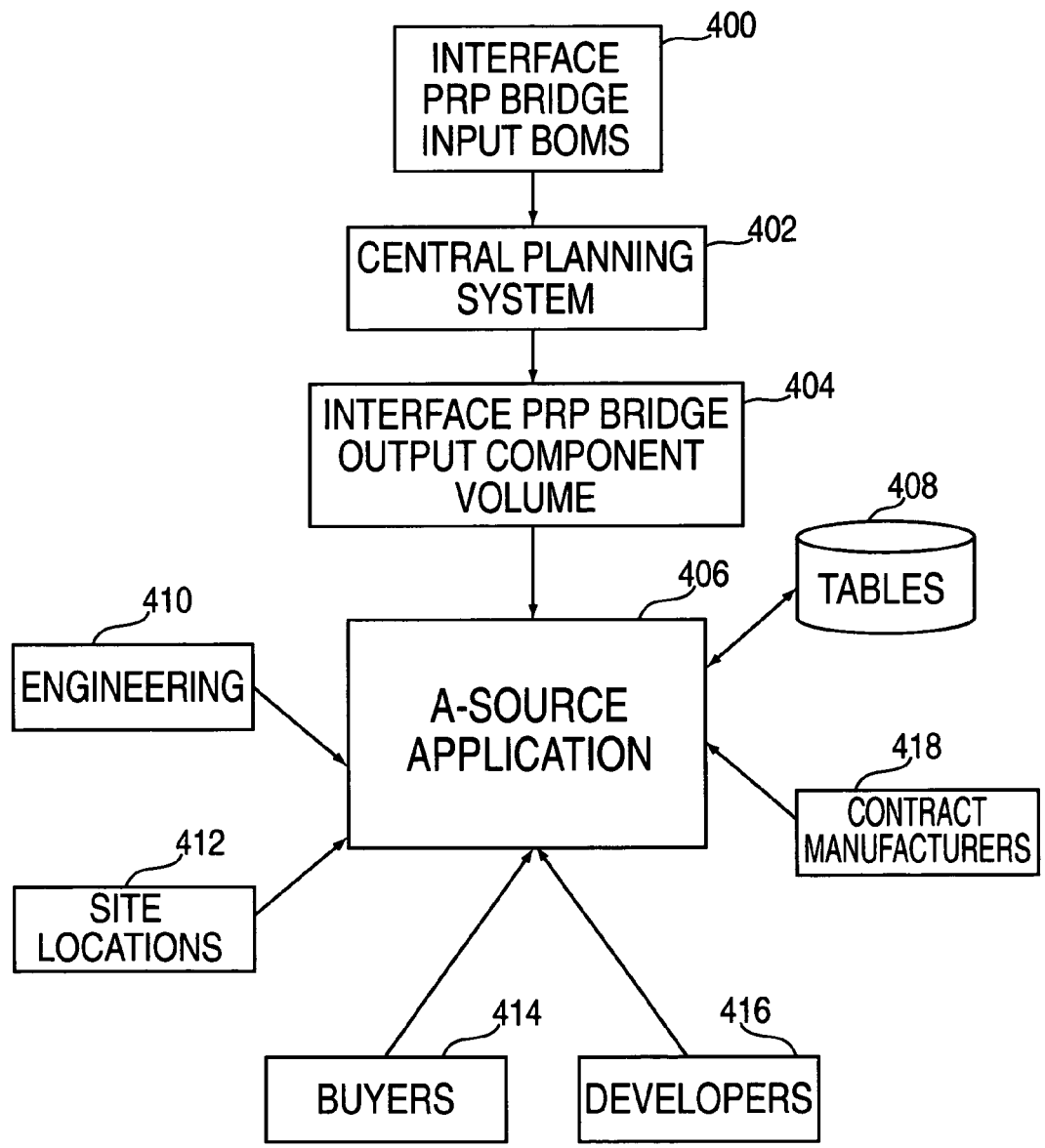
FIG. 4 is a block diagram illustrating the operational aspects of the A-source application and parts requirement planning bridging tool.

Referring now to FIG. 4, the bridging component, or parts requirement planning bridge (PRP) is illustrated. An input bridge 400 receives BOM data and transmits it to a central planning system 402, which executes a suite of applications provided by the manufacturing enterprise 150. The PRP output bridge 404 is an interface between central planning system 402 and the A-source application 406. It receives data from central planning system 402 and converts the data into a format that can be understood by the A-source tool 406. The A-source tool 406 develops tables representing key information and organizes the information according to the needs of manufacturing enterprise system 150. These tables are stored in database 408. The A-source tool 406 receives inputs from a variety of sources, such as engineering 410, site locations 412, buyers 414, developers 416, and contract manufacturers 418.

Figure 5:
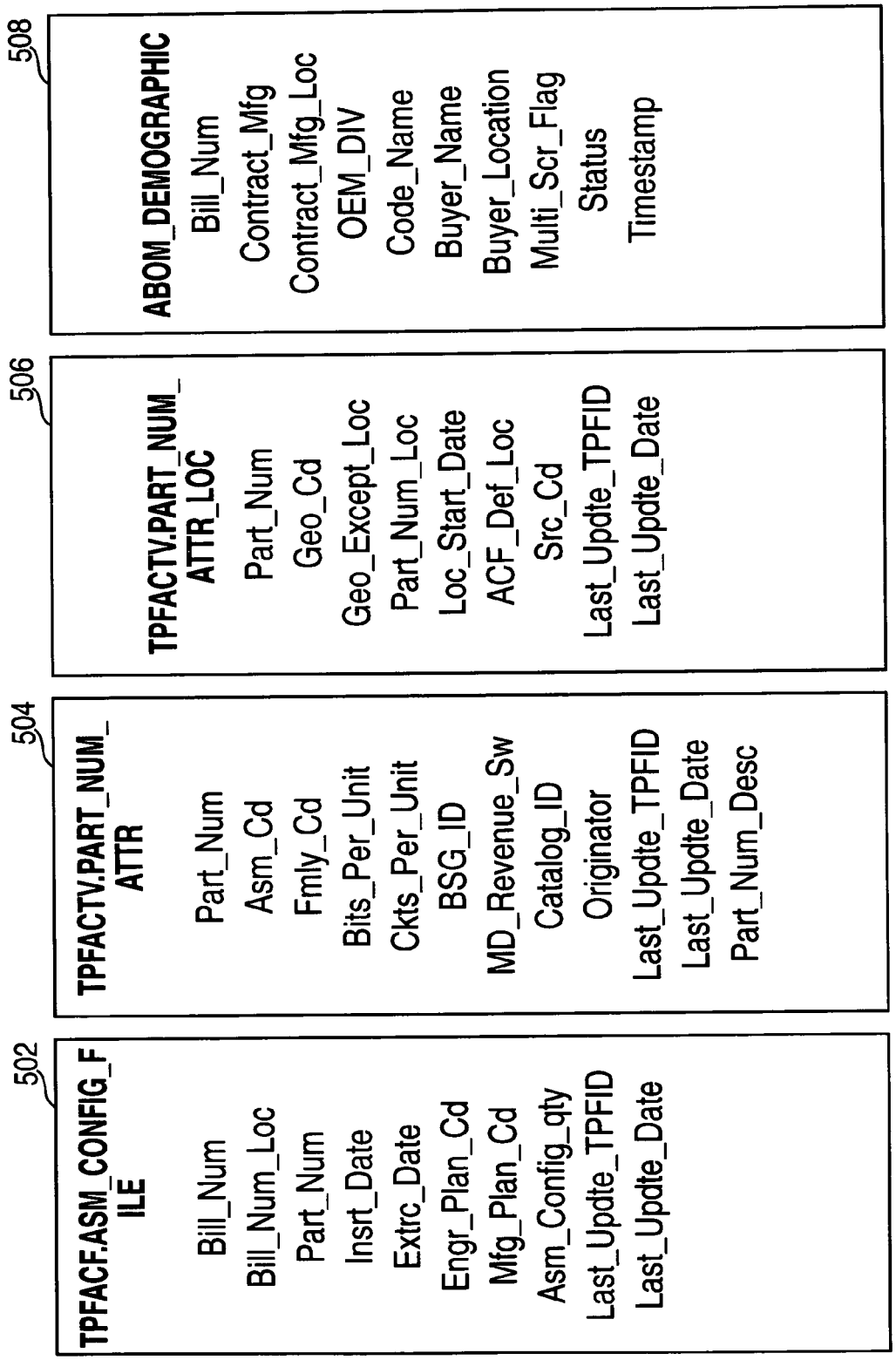
FIG. 5 illustrates the structure of a bill of material used by the parts requirement planning bridge for inputting bills of material into the A-source application.

The required BOM structure to be loaded in the parts requirement planning bridge tables are shown in FIG. 5. These four tables are displayed by the TPFACF.ASM_CONFIG_FILE table 502, TPFACTV.PART_NUM_ATTR table

504, TPFACTV.PART_NUM_ATTR_LOC Table 506, and ABOM_DEMOGRAPHIC Table 508.

The TPFACF.ASM_CONFIG_FILE table 502 holds specified data relating to the parts/components listed in a BOM file as follows:

ACF Sources/Conditions

| | | |
|---|---|---|
| Bill_Num | CHAR (12) | →Bill_Num |
| Bill_Num_Loc | CHAR (3) | →Default to 'Z90' |
| Part_Num | CHAR (12) | →Component Part Number |
| Insrt_Date | DATE | →Component Start Date if any, default = blank |
| Extrc_Date | DATE | →Component End Date if any, default = blank |
| Engr_Plan_Cd | CHAR (1) | →Component Engr_Plan_Cd if any, default = blank |
| Mfg_Plan_Cd | CHAR (1) | →'P' or 'V' as defined in process; default = blank |
| Asm_Config_qty | DECIMAL (10 4) | →Component usage per assembly |
| Last_Updte_TPFID | CHAR (8) | →Special ID setup for the A-source load into EPPS |
| Last_Updte_Date | TIMESTAMP | →Use Date when the EPPS load is run |

If a bill of material already exists for 'Z90', the 'Z90' bill of material is replaced.

The TPFACFTV.PART_NUM_ATTR table 504 enables the A-source tool to add part numbers to components in the system if required and to assign unique part numbers for new parts along with a description. The information provided by this table is as follows:

PNA Sources/Conditions

| | | |
|---|---|---|
| Bill_Num | CHAR (12) | →Bill_Num |
| Bill_Num_Loc | CHAR (3) | →Default to 'Z90' |
| Part_Num | CHAR (12) | →Component Part Number |
| Insrt_Date | DATE | →Component Start Date if any, default = blank |
| Extrc_Date | DATE | →Component End Date if any, default = blank |
| Engr_Plan_Cd | CHAR (1) | →Component Engr_Plan_Cd if any, default = blank |
| Mfg_Plan_Cd | CHAR (1) | →'P' or 'V' as defined in process, default = blank |
| Asm_Config_qty | DECIMAL (10 4) | →Component usage per assembly |
| Last_Updte_TPFID | CHAR (8) | →Special ID setup for the A-Source load into EPPS |
| Last_Updte_Date | TIMESTAMP | →Use Date when the EPPS load is run |

The TPFACFTV.PART_NUM_ATTR_LOC table 506 assigns each part number to a specific contract manufacturer. This allows manufacturing enterprise system 150 to identify who it is getting its parts from. This information is useful in establishing a volume structure for present and future production planning. This table is illustrated as follows:

PNAL Sources/Conditions

| | | |
|---|---|---|
| Part_Num | CHAR (12) | →Assembly Part Number |
| Geo_Cd | CHAR (1) | →A, E, L, U (4 separate records) |
| Geo_Except_Loc | CHAR (3) | →Default to 'Z90' |
| Part_Num_Loc | CHAR (3) | →Default to 'Z90' |
| Loc_Start_Date | DATE | →Default to blank |

-continued

| | | |
|---|---|---|
| ACF_Def_Loc | CHAR (1) | →Default to 'Y' |
| Src_Cd | CHAR (1) | →Default to 'A' |
| Last_Updte_TPFID | CHAR (8) | →Special ID setup for the A-source load into EPPS |
| Last_Updte_Date | TIMESTAMP | |

The ABOM_DEMOGRAPHIC table 508 is illustrated as follows:

AD:EPPS.ABOM_DEMOGRAPHIC Sources/Conditions

| | |
|---|---|
| Bill_Num | →Assembly Part Number |
| Contract_Mfg | →Contract Manufacturer Name |
| Contract_Mfg_Loc | →Contract Manufacturer Location |
| OEM_Div | →OEM Division for Assembly part number |
| Code_Name | →Assembly Part Number Code Name |
| Buyer_Name | →Assembly Part Number Buyer Name |
| Buyer_Location | →Assembly Part Number Buyer's location |
| Multi_Src_Flag | →'Y' if more than one contract manufacturer for the same assembly |
| Status | →Status of the assembly BOM |

The PRP tool allows BOM configuration data (or physical attributes) stored in one or more databases to be combined with BOM business attributes stored in a separate database or databases. Examples of business attributes include: whether the part can be purchased by direct rebate, whether the part is price-masked, and whether an existing contract specifies how the part is to be procured. The configuration data, together with the business attributes data, allow manufacturing enterprise system 150 to create a consolidated demand statement including forecasting information. The A-source tool generates this consolidated demand statement and transmits it to supplier enterprise system 160 for action.

Having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method of managing a supply chain within a multi-enterprise environment via a computer network, said multi-enterprise environment including a manufacturing enterprise and at least one supply chain entity, comprising:
    loading a bill of material file into said computer network;
    processing said bill of material file including verifying demographic information, collecting data pertaining to pricing and items listed in external warehouse files, and mapping the items to a commodity;
    generating a bid request from said bill of material file resulting from the processing, and transmitting said bid request to a web site;
    receiving marketing data relating to the bill of material file including customer demand for components manufactured by the manufacturing enterprise;
    receiving at least one bid response by said at least one supply chain entity;
    analyzing said bid response in view of results of the processing of said bill of material file to determine which of the components manufactured by the manufacturing enterprise are in demand by customers at a given time;

generating an award notice based at least in part on customer demand and availability of components produced internally compared to similar components offered by outside source;

transmitting said award notice to said at least one supply chain entity, based upon results of said analyzing; and tracking selected activities in a log.

2. The method of claim 1, wherein said processing said bill of material file includes mapping items contained in said bill of material file from said manufacturing enterprise with items provided by external sources via said network, said external sources including at least one of:
   a database of said manufacturing enterprise;
   a data warehouse; and
   a technical manual.

3. The method of claim 2, wherein said items contained in said bill of material file include:
   at least one component number;
   at least one component name;
   at least one component description;
   at least one component price; and
   at least one component availability.

4. The method of claim 2, wherein said items provided by said external sources include:
   at least one component number;
   at least one component name;
   at least one component description;
   at least one component price; and
   at least one component availability.

5. The method of claim 1, wherein said processing said bill of material file includes automatically transmitting notifications to an administrative entity of said manufacturing enterprise via said network.

6. The method of claim 1, wherein said network is an extranet.

7. The method of claim 1, wherein said analyzing said bid response includes comparing data contained in said bill of material file with data contained in said bid response.

8. The method of claim 1, wherein said supply chain entity is a contract manufacturer.

9. The method of claim 1, wherein said supply chain entity is a supplier.

10. A method of managing a supply chain within a multi-enterprise environment via a computer network, said multi-enterprise environment including a manufacturing enterprise and at least one supply chain entity, comprising:
    loading a bill of material file into said computer network;
    processing said bill of material file including verifying demographic information, collecting data pertaining to pricing and items listed in external data warehouse files, and mapping the items to a commodity;
    generating a bid request from said bill of material file resulting from the processing, and transmitting said bid request to a web site;
    receiving marketing data relating to the bill of material file including customer demand for components manufactured by the manufacturing enterprise;
    receiving at least one bid response by said at least one supply chain entity;
    analyzing said bid response in view of results of the processing of said bill of material file to determine which of the component manufactured by the manufacturing enterprise are in demand by customers at a given time;
    generating an award notice based at least in part on customer demand and availability of components produce internally compared to similar components offered by outside sources;
    transmitting said award notice to said at least one supply chain entity, based upon results of said analyzing; and
    tracking selected activities in a log;
    wherein said processing said bill of material file includes associating physical attributes of components listed on said bill of material file with corresponding business attributes or said components.

11. The method of claim 10, wherein said processing said bill of material file includes mapping items contained in said bill of material file from said manufacturing enterprise with items provided by external sources via said network, said external sources including at least one of:
    a database of said manufacturing enterprise;
    a data warehouse; and
    a technical manual.

12. The method of claim 11, wherein said items contained in said bill of material file include:
    at least one component number;
    at least one component name;
    at least one component description;
    at least one component price; and
    at least one component availability.

13. The method of claim 11, wherein said items provided by said external sources include:
    at least one component number;
    at least one component name;
    at least one component description;
    at least one component price; and
    at least one component availability.

14. The method of claim 10, wherein said processing said bill of material file includes automatically transmitting notifications to an administrative entity of said manufacturing enterprise via said network.

15. The method of claim 10, wherein said network is an extranet.

16. The method of claim 10, wherein said analyzing said bid response includes comparing data contained in said bill of material file with data contained in said bid response.

17. The method of claim 10, wherein said supply chain entity is a contract manufacturer.

18. The method of claim 10, wherein said supply chain entity is a supplier.

19. The method of claim 10, wherein said business attributes include a price masked component.

20. The method claim 10, wherein said business attributes include a consignment component.

21. The method of claim 10, wherein said business attributes include a buy off contract.

22. The method of claim 10, wherein said business attributes include a direct rebate plan.

23. A storage medium with computer-readable computer program code for managing a supply chain within a multi-enterprise environment via a computer network, said multi-enterprise environment including a manufacturing enterprise and at least one supply chain entity, the storage medium including instructions for causing a computer to implement a method, comprising:
    loading a bill of material file into said computer network;
    processing said bill of material file including verifying demographic information, collecting data pertaining to pricing and item listed in external data warehouse files, and mapping the items to a commodity;

generating a bid request from said bill of material file resulting from the processing, and transmitting said bid request to a web site;
receiving marketing data relating to the bill of material file including customer demand for components manufacturing by the manufacturing enterprise;
receiving at least one bid response by said at least one supply chain entity;
analyzing said bid response in view of results of the processing of said bill of material file to determine which of the components manufactured by the manufacturing enterprise are in demand by customer at a given time;
generating an award notice based at least in part on customer demand and availability of components produced internally compared to similar components offered by outside sources;
transmitting said award notice to said at least one supply chain entity, based upon results of said analyzing; and
tracking selected activities in a log.

24. The storage medium of claim 23, wherein said processing said bill of material file includes mapping items contained in said bill of material file from said manufacturing enterprise with items provided by external sources via said network, said external sources including at least one of:
a database of said manufacturing enterprise;
a data warehouse; and
a technical manual.

25. The storage medium of claim 24, wherein said items contained in said bill material file include:
at least one component number;
at least one component name;
at least one component description;
at least one component price; and
at least one component availability.

26. The storage medium of claim 24, wherein said items provided by said external sources include:
at least one component number;
at least one component name;
at least one component description;
at least one component price; and
at least one component availability.

27. The storage medium of claim 23, wherein said processing said bill of material file includes automatically transmitting notifications to an administrative entity of said manufacturing enterprise via said network.

28. The storage medium of claim 23, wherein said network is an extranet.

29. The storage medium of claim 23, wherein said analyzing said bid response includes comparing data contained in said bill of material file with data contained in said bid response.

30. The storage medium of claim 23, wherein said supply chain entity is a contract manufacturer.

31. The storage medium of claim 23, wherein said supply chain entity is a supplier.

32. A storage medium with computer-readable computer program code for managing a supply chain within a multi-enterprise environment via a computer network, said multi-enterprise environment including a manufacturing enterprise and at least one supply chain entity, the storage medium including instructions for causing a computer to implement a method, comprising:
loading a bill of material file into said computer network;
processing said bill of material file including verifying demographic information, collecting data pertaining to pricing and items listed in external data warehouse files and mapping the items to a commodity;
generating a bid request from said bill of material file resulting from the processing transmitting said bid request to a web site;
receiving marketing data relating to the bill of material file including customer demand for components manufactured by the manufacturing enterprise;
receiving at least one bid response by said at least one supply chain entity;
analyzing said bid response in view of results of the processing of said bill of material file to determine which of the components manufactured by the manufacturing enterprise are in demand by customers at a given time;
generating an award notice based at least in part on customer demand and availability of components produced internally compared to similar components offered by outside sources;
transmitting said award notice to said at least one supply chain entity, based upon results of said analyzing; and
tracking selected activities in a log;
wherein said processing said bill of material file includes associating physical attributes of components listed on said bill of material file with corresponding business attributes of said components.

33. The storage medium of claim 32, wherein said processing said bill of material file includes mapping items contained in said bill of material file from said manufacturing enterprise with items provided by external sources via said network, said external sources including at least one of:
a data of said manufacturing enterprise;
a data warehouse; and
a technical manual.

34. The storage medium of claim 33, wherein said item contained in said bill material file include:
at least one component number;
at least one component name;
at least one component description;
at least one component price; and
at least one component availability.

35. The storage medium of claim 33, wherein said items provided by said external sources include:
at least one component number;
at least one component name;
at least one component description;
at least one component price; and
at least one component availability.

36. The storage medium of claim 32, wherein said processing said bill of material file includes automatically transmitting notifications to an administrative entity of said manufacturing enterprise via said network.

37. The storage medium of claim 32, wherein said network is an extranet.

38. The storage medium of claim 32, wherein said analyzing said bid response includes comparing data contained in bill of material file with data contained in said bid response.

39. The storage medium of claim 32, wherein said supply chain entity is a contract manufacturer.

40. The storage medium of claim 32, wherein said supply chain entity is a supplier.

41. The storage medium of claim 32, wherein said business attributes include a price masked component.

42. The storage medium of claim 32, wherein said business attributes include a consignment component.

43. The storage of claim 32, wherein said business attributes include a buy off contract.

44. The storage of claim 32, wherein said business attributes include a direct rebate plan.

* * * * *